United States Patent
Yang et al.

(10) Patent No.: US 6,946,175 B2
(45) Date of Patent: *Sep. 20, 2005

(54) OXYGEN SCAVENGING POLYMERS AS ACTIVE BARRIER TIE LAYERS IN MULTILAYERED STRUCTURES

(75) Inventors: Hu Yang, Manvel, TX (US); Ta Yen Ching, Houston, TX (US); Gangfeng Cai, Arlington, TX (US)

(73) Assignee: Chevron Phillips Chemical Co., LP, The Woodlands, TX (US)

( * ) Notice: Subject to any disclaimer, the term of this patent is extended or adjusted under 35 U.S.C. 154(b) by 90 days.

This patent is subject to a terminal disclaimer.

(21) Appl. No.: 10/609,050

(22) Filed: Jun. 27, 2003

(65) Prior Publication Data

US 2003/0235708 A1 Dec. 25, 2003

(Under 37 CFR 1.47)

Related U.S. Application Data

(63) Continuation-in-part of application No. 09/727,110, filed on Nov. 30, 2000, now abandoned, and a continuation-in-part of application No. 09/127,316, filed on Jul. 31, 1998.

(51) Int. Cl.⁷ .............................................. B29O 22/00
(52) U.S. Cl. ................... 428/35.9; 428/35.7; 428/36.7; 428/35.6; 428/35.8; 428/36.6; 252/188.28; 229/100
(58) Field of Search ............................. 428/35.9, 35.7, 428/36.7, 35.6, 35.8, 36.6; 252/188.28; 229/100

(56) References Cited

U.S. PATENT DOCUMENTS

| | | | |
|---|---|---|---|
| 3,497,571 A | 2/1970 | Tellier et al. ............... 260/844 |
| 3,536,687 A | 10/1970 | Nordstrom ................. 260/89.5 |
| 4,415,710 A | 11/1983 | Barnabeo et al. ........... 525/370 |
| 4,524,201 A | 6/1985 | Barnabeo et al. ........... 528/395 |
| 5,116,916 A | 5/1992 | Young ........................ 525/350 |
| 5,211,875 A | 5/1993 | Speer et al. ........... 252/188.28 |
| 5,346,644 A | 9/1994 | Speer et al. ........... 252/188.28 |
| 5,425,896 A | 6/1995 | Speer et al. ........... 252/188.28 |
| 5,466,756 A | 11/1995 | Roach et al. ............. 525/330.6 |
| 5,498,364 A | 3/1996 | Speer et al. ........... 252/188.28 |
| 5,627,239 A | 5/1997 | Ching et al. ............. 525/330.6 |
| 5,641,825 A | 6/1997 | Bacskai et al. ............. 524/398 |
| 5,656,692 A | 8/1997 | Hayes ......................... 525/63 |
| 5,660,761 A | 8/1997 | Katsumoto et al. .... 252/188.28 |
| 5,700,554 A | 12/1997 | Speer et al. ................ 428/220 |
| 5,736,616 A | 4/1998 | Ching et al. ............. 525/330.3 |
| 5,776,361 A | 7/1998 | Katsumoto et al. .... 252/188.28 |
| 5,837,158 A | 11/1998 | Shepodd et al. ......... 252/181.6 |
| 5,859,145 A | 1/1999 | Ching et al. ............. 525/330.6 |
| 6,057,013 A | 5/2000 | Ching et al. ............... 428/35.7 |
| 6,063,307 A | 5/2000 | Shepodd et al. ......... 252/181.6 |
| 6,333,087 B1 * | 12/2001 | Jerdee et al. ............... 428/35.9 |
| 6,406,644 B2 * | 6/2002 | Jerdee et al. ........... 252/188.28 |
| 6,569,506 B1 * | 5/2003 | Jerdee et al. ............... 428/35.7 |

FOREIGN PATENT DOCUMENTS

| | | |
|---|---|---|
| DE | 1 900 181 | 10/1969 |
| EP | 0 040 983 A1 | 12/1981 |
| EP | 0 418 011 A2 | 3/1991 |
| WO | WO95/02616 | 1/1995 |
| WO | WO96/40799 | 12/1996 |
| WO | WO99/48963 | 9/1999 |
| WO | WO00/11972 | 3/2000 |

OTHER PUBLICATIONS

Ching et al., "Tasteless Oxygen Scavenging Polymers: A New Platform Technology for Food Packaging Based On Controlled Oxidation," *Oxygen Absorber . . . 2001 and Beyond*, OSP Conference, pp. 1–8 (Chicago, Jun. 19–20, 2000).

Ching et al., "Tasteless Oxygen Scavenging Polymers: A New Platform Technology for Food Packaging Based On Controlled Oxidation," *Oxygen Absorber . . . 2001 and Beyond*, OSP Conference Slides (Chicago, Jun. 19–20, 2000).

PCT/US99/06379 International Search Report (Sep. 24, 1999).

PCT/US01/47263 International Search Report (Jul. 8, 2002).

* cited by examiner

Primary Examiner—Leszek Kiliman

(57) ABSTRACT

Herein is disclosed multilayer packaging articles comprising an oxygen barrier layer comprising ethylene/vinyl alcohol copolymer (EVOH) (an "EVOH oxygen barrier layer"); an oxygen scavenging layer adjacent thereto, wherein the oxygen scavenging layer comprises a polymer comprising an ethylenic backbone and a cycloalkenyl group having structure I:

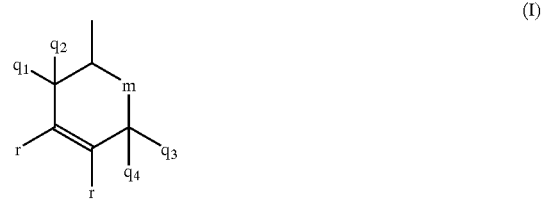

(I)

wherein $q_1$, $q_2$, $q_3$, $q_4$, and r are independently selected from hydrogen, methyl, or ethyl; m is —$(CH_2)_n$—, wherein n is an integer from 0 to 4, inclusive, and, when r is hydrogen, at least one of $q_1$, $q_2$, $q_3$, and $q_4$ is also hydrogen; and a third layer adjacent to the oxygen scavenging layer. In addition to the oxygen scavenging function, the oxygen scavenging layer functions as a tie layer to substantially inhibit delamination of the EVOH oxygen barrier layer from the third layer of the packaging article.

33 Claims, No Drawings

OXYGEN SCAVENGING POLYMERS AS ACTIVE BARRIER TIE LAYERS IN MULTILAYERED STRUCTURES

The present application is a continuation-in-part of prior copending patent application Ser. No. 09/127,316, filed Jul. 31, 1998, and is a continuation-in-part of prior patent application Ser. No. 09/727,110, filed Nov. 30, 2000 now abandoned.

BACKGROUND OF THE INVENTION

1. Field of the Invention

The present invention relates generally to the field of oxygen scavenging polymers. More particularly, it concerns multilayered packaging articles comprising an ethylene/vinyl alcohol copolymer (EVOH) oxygen barrier layer and an oxygen scavenging layer comprising an oxygen scavenging polymer, especially ethylene/methyl acrylate/cycloalkenylmethyl acrylate copolymers. The oxygen scavenging layer may also function as a tie layer useful in providing adhesion for the EVOH layer.

2. Description of Related Art

It is well known that limiting the exposure of oxygen-sensitive products to oxygen maintains and enhances the quality and shelf-life of the product. For instance, by limiting the oxygen exposure of oxygen sensitive food products in a packaging system, the quality of the food product is maintained, and food spoilage is avoided. In addition such packaging also keeps the product in inventory longer, thereby reducing costs incurred from waste and restocking. In the food packaging industry, several means for limiting oxygen exposure have already been developed, including modified atmosphere packaging (MAP), vacuum packaging and oxygen barrier film packaging. In the first two instances, reduced oxygen environments are employed in the packaging, while in the latter instance, oxygen is physically prevented from entering the packaging environment.

Another technique for limiting oxygen exposure involves incorporating an oxygen scavenger into the packaging structure. Incorporation of a scavenger in the package can scavenge environmental oxygen as it diffuses into the packaging structure, as well as scavenging residual oxygen present inside the package upon filling. Generally, the oxygen scavenger functions by irreversibly reacting with oxygen, and as a result, there exists a maximum amount of oxygen (the "oxygen scavenging capacity") that the scavenger can scavenge, and therefore, there is a limit to the shelf life of the packaged article.

However, increasing the oxygen scavenging capacity by increasing the quantity of the oxygen scavenging polymer has the disadvantage of, typically, impairing the structural properties of the packaging article, as well as increasing the cost of materials and the cost or complexity of processing. Also, the oxygen scavenging rate should desirably be at least about as fast as the transmission rate of oxygen from the environment through the package wall.

From this, it will be recognized that limiting oxygen ingress into the packaging article is beneficial. If oxygen ingress into the packaging article is limited, less of the oxygen scavenging polymer will be required, and less can be used, thus improving the cost efficiency, physical properties, and processing of the packaging article. This is especially significant for products that are oxygen-sensitive but otherwise fairly resistant to spoilage, and are thus capable of shelf-lives on the order of at least months, or up to a year or more, such as beer or wine.

Ethylene/vinyl alcohol copolymer (EVOH) is widely known for having excellent barrier properties to gases (such as $O_2$ and $CO_2$) and other fluids, and has found wide use in packaging applications where barrier properties are desired. However, it is generally regarded as an insufficient oxygen barrier for packaging applications which require very strong oxygen barrier properties over a long period of time, such as beer packaging. Enhancement of the oxygen barrier properties of EVOH in a multilayered structure could be achieved by the use of an oxygen scavenging layer as described above.

However, in multilayer packaging articles, EVOH layers frequently delaminate from adjacent layers, and thus typically require the use of a tie layer or layers between the EVOH layer and other layers of the packaging article. Such tie layers typically do not provide any other benefit to the packaging article. An exception to this trend is nylon, which is known to bind EVOH and can provide other benefits to a packaging article.

Therefore, it would be desirable to have a packaging article comprising an EVOH layer and an oxygen scavenging layer or layers, which packaging article would be better suited for providing a very strong oxygen barrier over a long period of time than are packaging articles currently known. Also, it would be desirable for the oxygen scavenging layer or layers which are adjacent to the EVOH layer to function as tie layers in addition to their oxygen scavenging function.

SUMMARY OF THE INVENTION

In one set of embodiments, the present invention relates to a packaging article, comprising:

at least one ethylene/vinyl alcohol copolymer (EVOH) oxygen barrier layer;

at least one oxygen scavenging layer adjacent thereto, wherein the oxygen scavenging layer comprises a polymer comprising an ethylenic backbone and a cycloalkenyl group having structure I:

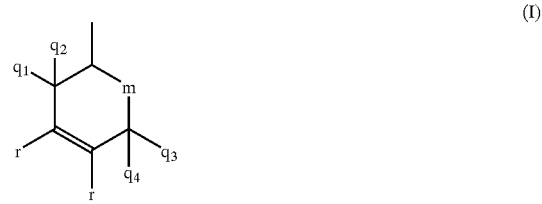

wherein $q_1$, $q_2$, $q_3$, $q_4$, and r are independently selected from hydrogen, methyl, or ethyl; m is —$(CH_2)_n$—, wherein n is an integer from 0 to 4, inclusive, and, when r is hydrogen, at least one of $q_1$, $q_2$, $q_3$, and $q_4$ is also hydrogen; and at least one third layer adjacent to the oxygen scavenging layer.

The packaging article can be flexible or rigid. The packaging article can further comprise a structural layer or layers; an oxygen barrier layer not comprising EVOH; an oxygen scavenging layer not adjacent to an EVOH oxygen barrier layer, not comprising a polymer comprising an ethylenic backbone and a cycloalkenyl group having structure I, or both; an oxygen permeable layer or layers; or an adhesive layer or layers; among others.

The present invention provides packaging articles that have a very strong oxygen barrier for a long period of time, by taking advantage of the inherent oxygen barrier property of the EVOH layer and the oxygen scavenging property of the oxygen scavenging layer. The present invention also provides packaging articles wherein the oxygen scavenging layer functions as a tie layer between the EVOH layer and the third layer, thereby reducing the materials expense and the processing steps required to form a packaging article with conventional tie layers known in the art.

DESCRIPTION OF ILLUSTRATIVE EMBODIMENTS

In one embodiment, the present invention relates to a packaging article comprising:

at least one ethylene/vinyl alcohol copolymer (EVOH) oxygen barrier layer;

at least one oxygen scavenging layer adjacent thereto, wherein the oxygen scavenging layer comprises a polymer comprising an ethylenic backbone and a cycloalkenyl group having structure I:

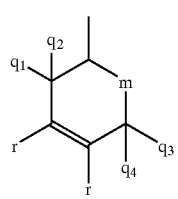

(I)

wherein $q_1$, $q_2$, $q_3$, $q_4$, and r are independently selected from hydrogen, methyl, or ethyl; m is —$(CH_2)_n$—, wherein n is an integer from 0 to 4, inclusive, and, when r is hydrogen, at least one of $q_1$, $q_2$, $q_3$, and $q_4$ is also hydrogen; and at least one third layer adjacent to the oxygen scavenging layer.

Packaging articles typically come in several forms, e.g. flexible or rigid. Typical articles include plastic, paper or cardboard cartons or bottles such as juice containers, soft drink containers, thermoformed trays, or cups, which have wall thicknesses in the range of 100 to 1000 micrometers. Typical flexible bags include those used to package many food items, and will likely have thicknesses of 5 to 250 micrometers. The walls of such articles according to the present invention comprise multiple layers of material.

The packaging article can be used to package any product for which it is desirable to inhibit oxygen damage during storage, e.g. food, beverage, pharmaceuticals, medical products, corrodible metals, or electronic devices. It is especially useful for packaging products for which it is desirable to inhibit oxygen damage for a long period of time, e.g. beer, wine, and other beverages. It is also especially useful for packaging products for which it is desirable to retain carbon dioxide, e.g. beer, sparkling wine, and soft drinks.

The packaging article can comprise one or more EVOH oxygen barrier layers and one or more oxygen scavenging layers, provided that at least one face of the EVOH oxygen barrier layer has an oxygen scavenging layer adjacent thereto. The other face of the EVOH oxygen barrier layer may (i) be adjacent to an oxygen scavenging layer as above, (ii) be adjacent to a tie layer, preferably a moisture-barrier tie layer, as is known in the art, or (iii) form the inner or outer surface of the packaging article (i.e. contact the contents of the packaging article or the environment, respectively). Optionally, the packaging article may comprise additional layers, such as an oxygen scavenging layer either not comprising a polymer comprising an ethylenic backbone and a cycloalkenyl group of structure I, not adjacent to an EVOH oxygen barrier layer, or both; an oxygen barrier layer not comprising EVOH; a food-contact layer; a structural layer; a tie layer not comprising an oxygen scavenging polymer; or an adhesive layer; alone or in any combination.

Packaging articles with multiple layers are typically prepared using coextrusion, injection molding, injection blow molding, stretch blow molding, coating, or lamination, among other techniques. The packaging articles may be rigid or flexible, based on the number and type of layers, the method of formation of the packaging article, and other parameters apparent to one of ordinary skill in the art.

As stated above, the packaging article comprises at least one EVOH oxygen barrier layer; at least one oxygen scavenging layer adjacent thereto, wherein the oxygen scavenging layer comprises a polymer comprising an ethylenic backbone and a cycloalkenyl group having structure I; and at least one third layer adjacent to the oxygen scavenging layer. As used herein to refer to layers of a packaging article, "adjacent" means substantially all of a face of a first layer is in direct contact with substantially all of a face of a second layer. We have discovered that oxygen scavenging layers as described below are capable of additionally functioning as tie layers for EVOH; in other words, the oxygen scavenging layers substantially inhibit delamination of the EVOH oxygen barrier layer or layers from the at least one third layer of the packaging article.

As used herein, "EVOH oxygen barrier layer" refers to a layer of a given thickness comprising EVOH at a concentration sufficient to inhibit oxygen passage through the layer. One of ordinary skill in the art will recognize that the EVOH concentration sufficient to inhibit oxygen passage will decrease with increasing thickness of the layer. The ethylene/vinyl alcohol copolymer in the EVOH oxygen barrier layer can comprise any proportion of ethylene and vinyl alcohol units, typically from about 5 mol % ethylene/ 95 mol % vinyl alcohol to about 95 mol % ethylene/5 mol % vinyl alcohol, preferably from about 20 mol % ethylene/ 80 mol % vinyl alcohol to about 80 mol % ethylene/20 mol % vinyl alcohol. Preferably, the EVOH oxygen barrier layer comprises at least about 90 wt % EVOH. More preferably, the EVOH oxygen barrier layer comprises at least about 95 wt % EVOH. Even more preferably, the EVOH oxygen barrier layer comprises at least about 99 wt % EVOH. Other compounds that optionally may be present in the EVOH oxygen barrier layer include dyes, pigments, fillers, or structural polymers, among others.

The oxygen scavenging polymer in the oxygen scavenging layer adjacent to the EVOH oxygen barrier layer is a cyclic olefinic polymer, which as used herein means the oxygen scavenging polymer comprises an ethylenic backbone and at least one cyclic olefinic pendant group. Use of the term "polymer" encompasses homopolymers, copolymers, terpolymers, and higher order polymers. More preferably, the cyclic olefinic pendant group is a cycloalkenyl group having structure I:

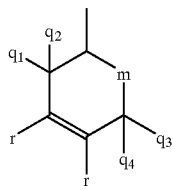

(I)

wherein $q_1$, $q_2$, $q_3$, $q_4$, and r are independently selected from hydrogen, methyl, or ethyl; m is —$(CH_2)_n$—, wherein n is an integer from 0 to 4, inclusive; and, when r is hydrogen, at least one of $q_1$, $q_2$, $q_3$, and $q_4$ is also hydrogen.

In one preferred embodiment, the oxygen scavenging compound is ethylene/vinyl cyclohexene copolymer (EVCH).

Preferably, the oxygen scavenging polymer further comprises a linking group linking the ethylenic backbone to the cyclic olefinic group. The linking group is selected from: —O—$(CHR)_n$—; —(C=O)—O—$(CHR)_n$—; —NH—$(CHR)_n$—; —O—(C=O)—$(CHR)_n$—; —(C=O)—NH—$(CHR)_n$—; or —(C=O)—O—CHOH—$CH_2$—O—.

Preferably, the cyclic olefinic group is a cycloalkenyl group having structure I. More preferably, in structure I, n is 1, and $q_1$, $q_2$, $q_3$, $q_4$, and r are each hydrogen. Even more preferably, the oxygen scavenging polymer is a cyclohexenylmethyl acrylate homopolymer (CHAA), a cyclohexenylmethyl acrylate copolymer, a cyclohexenylmethyl methacrylate homopolymer (CHMA), a cyclohexenylmethyl methacrylate copolymer, or mixtures thereof. Most preferably, the oxygen scavenging polymer is ethylene/methyl acrylate/cyclohexenylmethyl acrylate copolymer (EMCM).

The oxygen scavenging layer can comprise from about 0.1% to about 100% of the oxygen scavenging polymer by weight. Preferably, the oxygen scavenging layer comprises from about 30% to about 95% of the oxygen scavenging polymer by weight. The remainder of the oxygen scavenging layer can be made up of other additives, as described below.

The oxygen scavenging layer, or a layer adjacent thereto, optionally can further comprise a transition metal. The transition metal functions to catalyze oxygen scavenging by the oxygen scavenging polymer, increasing the rate of scavenging and reducing the induction period. Though not to be bound by theory, useful transition metals include those which can readily interconvert between at least two oxidation states. See Sheldon, R. A.; Kochi, J. K.; "Metal-Catalyzed Oxidations of Organic Compounds" Academic Press, New York 1981.

Preferably, the transition metal is in the form of a salt, with the transition metal selected from the first, second or third transition series of the Periodic Table. Suitable metals include, but are not limited to, manganese, iron, cobalt, nickel, copper, rhodium, and ruthenium. The oxidation state of the metal when introduced need not necessarily be that of the active form. The metal is preferably iron, nickel, manganese, cobalt or copper; more preferably manganese or cobalt; and most preferably cobalt. Suitable counterions for the metal include, but are not limited to, chloride, acetate, oleate, stearate, palmitate, 2-ethylhexanoate, neodecanoate, or naphthenate, preferably $C_1$–$C_{20}$ alkanoates. Preferably, the salt, the transition metal, and the counterion are either on the U.S. Food and Drug Administration GRAS (generally regarded as safe) list, or exhibit substantially no migration from the packaging article to the product (i.e. less than about 500 ppb, preferably less than about 50 ppb, in the product). Particularly preferable salts include cobalt oleate, cobalt stearate, cobalt 2-ethylhexanoate, and cobalt neodecanoate. The metal salt may also be an ionomer, in which case a polymeric counterion is employed. Such ionomers are well known in the art.

Typically, the amount of transition metal may range from 0.001 to 1 wt % (10 to 10,000 ppm) of the oxygen scavenging layer, based on the metal content only (excluding ligands, counterions, etc.). In the packaging article, the transition metal can be formed in the oxygen scavenging layer or in a layer adjacent thereto.

Another compound that is often preferably added to the oxygen scavenging layer is a photoinitiator, or a blend of different photoinitiators, especially if antioxidants are included to prevent premature oxidation of the oxygen scavenging polymer.

Suitable photoinitiators are well known to those skilled in the art. Specific examples include, but are not limited to, benzophenone, o-methoxybenzophenone, acetophenone, o-methoxy-acetophenone, acenaphthenequinone, methyl ethyl ketone, valerophenone, hexanophenone, α-phenylbutyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, α-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7-H-benz[de] anthracen-7-one, benzoin tetrahydropyranyl ether, 4,4'-bis (dimethylamino)-benzophenone, 1'-acetonaphthone, 2'-acetonaphthone, acetonaphthone and 2,3-butanedione, benz[a]anthracene-7,12-dione, 2,2-dimethoxy-2-phenylacetophenone, α,α-diethoxyacetophenone, and α,α-dibutoxyacetophenone, among others. Singlet oxygen generating photosensitizers such as Rose Bengal, methylene blue, and tetraphenyl porphine may also be employed as photoinitiators. Polymeric initiators include poly(ethylene carbon monoxide) and oligo[2-hydroxy-2-methyl-1-[4-(1-methylvinyl)phenyl]propanone].

Use of a photoinitiator is preferable because it generally provides faster and more efficient initiation of oxygen scavenging by the oxygen scavenging polymer. However, due to the high cost of photoinitiators, it is desirable to use the minimum amount of photoinitiator required to initiate oxygen scavenging. This minimum amount will vary depending on the photoinitiator used, the wavelength and intensity of ultraviolet light used to initiate, and other factors. Preferably, the photoinitiator is either on the U.S. Food and Drug Administration GRAS (generally regarded as safe) list, or exhibits substantially no migration from the packaging article to the product (i.e. less than 50 ppb in the product).

Photoinitiators that are especially useful in the present invention include benzophenone derivatives containing at least two benzophenone moieties, as described in copending U.S. patent application Ser. No. 08/857,325, filed May 16, 1997. These compounds act as effective photoinitiators to initiate oxygen scavenging activity in the oxygen barrier composition of the present invention. Such benzophenone derivatives have a very low degree of extraction from oxygen scavenging compositions, which may lead to reduced malodor or off-taste of a packaged food, beverage, or oral pharmaceutical product by extracted photoinitiator.

A "benzophenone moiety" is a substituted or unsubstituted benzophenone group. Suitable substituents include alkyl, aryl, alkoxy, phenoxy, and alicylic groups contain from 1 to 24 carbon atoms or halides.

The benzophenone derivatives include dimers, trimers, tetramers, and oligomers of benzophenones and substituted benzophenones.

The benzophenone photoinitiators are represented by the formula:

$$A_a(B)_b$$

wherein A is a bridging group selected from sulfur; oxygen; carbonyl; —SiR"$_2$—, wherein each R" is individually selected from alkyl groups containing from 1 to 12 carbon atoms, aryl groups containing 6 to 12 carbon atoms, or alkoxy groups containing from 1 to 12 carbon atoms; —NR'"—, wherein R'" is an alkyl group containing 1 to 12 carbon atoms, an aryl group containing 6 to 12 carbon atoms, or hydrogen; or an organic group containing from 1 to 50 carbon atoms; a is an integer from 0 to 11; B is a substituted or unsubstituted benzophenone group; and b is an integer from 2 to 12.

The bridging group A can be a divalent group, or a polyvalent group with 3 or more benzophenone moieties. The organic group, when present, can be linear, branched, cyclic (including fused or separate cyclic groups), or an arylene group (which can be a fused or non-fused polyaryl group). The organic group can contain one or more heteroatoms, such as oxygen, nitrogen, phosphorous, silicon, or sulfur, or combinations thereof. Oxygen can be present in, for example, an ether, ketone, aldehyde, ester, or alcohol.

The substituents of B, herein R", when present, are individually selected from alkyl, aryl, alkoxy, phenoxy, or alicylic groups containing from 1 to 24 carbon atoms, or halides. Each benzophenone moiety can have from 0 to 9 substituents.

Preferably, the combined molecular weight of the A and R" groups is at least about 30 g/mole. Substituents can be selected to render the photoinitiator more compatible with the oxygen scavenging layer.

Examples of such benzophenone derivatives comprising two or more benzophenone moieties include dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer (a mixture of compounds containing from 2 to 12 repeating styrenic groups, comprising dibenzoylated 1,1-diphenyl ethane, dibenzoylated 1,3-diphenyl propane, dibenzoylated 1-phenyl naphthalene, dibenzoylated styrene dimer, dibenzoylated styrene trimer, and tribenzoylated styrene trimer), and substituted benzoylated styrene oligomer. Tribenzoyl triphenylbenzene and substituted tribenzoyl triphenylbenzene are especially preferred.

When a photoinitiator is used, its primary function is to enhance and facilitate the initiation of oxygen scavenging by the oxygen scavenging layer upon exposure to radiation. The amount of photoinitiator can vary. In many instances, the amount will depend on the blend ratio or the particular oxygen scavenging polymer used, the wavelength and intensity of UV radiation used, the nature and amount of antioxidants used, as well as the type of photoinitiator used, among other parameters. For instance, if the photoinitiator-containing component is placed underneath a layer which is somewhat opaque to the radiation used, more initiator may be needed. For most purposes, however, the amount of photoinitiator, when used, will be in the range of 0.01 to 10% by weight of the oxygen scavenging layer.

Other additives can be added to further facilitate or control the initiation of oxygen scavenging properties by the oxygen scavenging layer. Also, additional components such as a structural polymer or polymers can be added to render the layer more adaptable for use in a packaging article. Particular additives and components to be included in the oxygen scavenging layer can be readily chosen by the skilled artisan, depending on the intended use of the oxygen scavenging layer and other parameters.

Antioxidants may be used in the oxygen scavenging layer to control scavenging initiation. An antioxidant as defined herein is a material which inhibits oxidative degradation or cross-linking of polymers. Typically, antioxidants are added to facilitate the processing of polymeric materials or prolong their useful lifetime. In relation to this invention, such additives prolong the induction period for oxygen scavenging in the absence of irradiation. When it is desired to commence oxygen scavenging by the oxygen scavenging layer of the packaging article, the packaging article (and any incorporated photoinitiator) can be exposed to radiation.

Antioxidants such as 2,6-di(t-butyl)-4-methylphenol (BHT), 2,2'-methylene-bis(6-t-butyl-p-cresol), triphenylphosphite, tris-(nonylphenyl)phosphite, vitamin E, tetra-bismethylene 3-(3,5-ditertbutyl-4-hydroxyphenyl)-propionate methane, and dilaurylthiodipropionate are suitable for use with this invention.

The amount of antioxidant which may be present may also have an effect on oxygen scavenging. Antioxidants are usually present in oxidizable organic compounds or structural polymers to prevent oxidation or gelation of the polymers. Typically, they are present in about 0.01 to 1% by weight of the oxygen scavenging layer. However, additional amounts of antioxidant may also be added if it is desired to tailor the induction period, as will be apparent to one of ordinary skill in the art.

Other additives which can be included in the oxygen scavenging layer include, but are not necessarily limited to, fillers, pigments, dyestuffs, stabilizers, processing aids, plasticizers, fire retardants, and anti-fog agents, among others. Any other additives employed normally will not comprise more than 10% of the oxygen scavenging layer by weight, with preferable amounts being less than 5% by oxygen scavenging layer of the composition.

The oxygen scavenging layer can also comprise a structural polymer or polymers. Such polymers are thermoplastic and render the oxygen scavenging layer more adaptable for use in a packaging article. They also may, to some extent, provide a barrier to oxygen entry into the packaging article. Suitable structural polymers include, but are not limited to, polyethylene (PE), low density polyethylene (LDPE), very low density polyethylene (VLDPE), ultra-low density polyethylene (ULDPE), high density polyethylene (HDPE), polypropylene (PP), polystyrene (PS), polymethacrylate (PMA), polymethylmethacrylate (PMMA), polyethylene terephthalate (PET), polyvinyl chloride, ethylene-vinyl acetate, ethylene-alkyl(meth)acrylates, ethylene-(meth) acrylic acid, or ethylene-(meth)acrylic acid ionomers. In beverage containers, PET is often used.

Blends of different structural polymers may also be used. However, the selection of the structural polymer largely depends on the article to be manufactured and the end use thereof. Such selection factors are well known in the art. For instance, the clarity, cleanliness, effectiveness as an oxygen scavenger, barrier properties, mechanical properties, or texture of the article can be adversely affected by a blend containing a structural polymer which is incompatible with the oxygen scavenging polymer.

Preferably, the structural polymer in the oxygen scavenging layer is selected from PET, PP, LDPE, HDPE, PS, PMA, PMMA, or mixtures thereof.

In addition to the EVOH oxygen barrier layer, the oxygen scavenging layer, and the third layer, the packaging article can comprise other layers useful in a flexible or rigid multilayer packaging article.

As stated above, if a transition metal salt is included in the packaging article to increase the rate of oxygen scavenging or reduce the induction time, the transition metal can be included either in the oxygen scavenging layer or in a layer adjacent to the oxygen scavenging layer (i.e. either the EVOH oxygen barrier layer or the third layer). Any transition metal salt described above can be formed in the adjacent layer.

The oxygen scavenging layer can also comprise a photoinitiator, an antioxidant, or both, as described above. Other additives can also be included as desired. Also, the oxygen scavenging layer can comprise a structural polymer, as described above.

The third layer may comprise a structural polymer or structural material, an oxygen scavenging polymer, an oxygen-permeable material, or others known to the art and described below.

In addition to the third layer, optionally, the packaging article may comprise at least one structural layer located to the interior, the exterior, or both of the EVOH oxygen barrier layer. The structural layer or layers comprise a structural polymer or structural material that imparts useful structural properties, such as rigidity, flexibility, or strength, among others, to the packaging article.

The structural polymer is as described above. Preferably, the structural polymer is selected from polyethylene, low density polyethylene, very low density polyethylene, ultra-low density polyethylene, high density polyethylene, polyethylene terephthalate (PET), polyvinyl chloride, ethylene-vinyl acetate, ethylene-alkyl(meth)acrylates, ethylene-(meth)acrylic acid, or ethylene-(meth)acrylic acid ionomers.

Alternatively, the structural layer may comprise a structural material selected from paperboard or cardboard. In one preferred embodiment, the packaging article comprises a paperboard structural layer, an oxygen scavenging layer adjacent to the paperboard, and an EVOH oxygen barrier layer adjacent to the oxygen scavenging layer.

Also, the packaging article optionally may further comprise a second oxygen scavenging layer, meaning either not comprising a cyclic olefinic polymer, not adjacent to an EVOH oxygen barrier layer, or both.

A second oxygen scavenging layer not comprising a polymer comprising an ethylenic backbone and a cycloalkenyl group can comprise any other organic compound that irreversibly reacts with oxygen. The organic compound is preferably a polymer which comprises a hydrocarbon group or groups and a polymeric backbone. The hydrocarbon can be saturated or unsaturated, and substituted or unsubstituted. Examples of such hydrocarbons include, but are not limited to, diene polymers such as polyisoprene, polybutadiene, and copolymers thereof, e.g. styrene-butadiene. Such hydrocarbons also include polymeric compounds such as polypentenamer, polyoctenamer, and other polymers prepared by olefin metathesis; diene oligomers such as squalene; and polymers or copolymers derived from dicyclopentadiene, norbornadiene, 5-ethylidene-2-norbornene, or other monomers containing more than one carbon-carbon double bond (conjugated or non-conjugated). These hydrocarbons further include carotenoids such as β-carotene.

Examples of substituted hydrocarbons include, but are not limited to, those with oxygen-containing moieties, such as esters, carboxylic acids, aldehydes, ethers, ketones, or alcohols. Specific examples of such hydrocarbons include, but are not limited to, condensation polymers such as polyesters derived from monomers containing carbon-carbon double bonds; unsaturated fatty acids such as oleic, ricinoleic, dehydrated ricinoleic, and linoleic acids and derivatives thereof, e.g. esters. Such hydrocarbons also include polymers or copolymers derived from allyl(meth)acrylates, or polymers containing nitrogen, such as nylon or MXD6, among others.

Alternatively, the second oxygen scavenging layer can comprise a polymer comprising an ethylenic backbone and a cycloalkenyl group as described above, but not be adjacent to an EVOH oxygen barrier layer, following the definition of "adjacent" given above.

Regardless of the oxygen scavenging material included therein, the second oxygen scavenging layer optionally can comprise other additives, such as a photoinitiator, a transition metal catalyst, an antioxidant, a structural polymer, or others, alone or in any combination, as described above. The second oxygen scavenging layer can be an integral part of the packaging article, or it can be a liner, coating, sealant, gasket, adhesive, non-adhesive insert, or fibrous mat insert in the packaging article.

Additionally, a packaging article according to the present invention may further comprise at least one oxygen barrier layer, i.e. a layer having an oxygen transmission rate equal to or less than 100 cubic centimeters per square meter ($cc/m^2$) per day per atmosphere at room temperature (about 25° C.), wherein the oxygen barrier layer does not comprise EVOH. Such an oxygen barrier layer may comprise polyacrylonitrile, polyvinyl chloride, poly(vinylidene dichloride), polyethylene terephthalate (PET), polyethylene napthalate, silica, metal foil, polyamides (e.g. nylon 6, nylon 6,6, aromatic polyamide, or semiaromatic polyamide), or mixtures thereof. However, because the EVOH oxygen barrier layer and the oxygen scavenging layer adjacent thereto inhibit oxygen transmission to a high degree, the need for an oxygen barrier layer not comprising EVOH is reduced and may, depending on the form of the packaging article and the intended use, be dispensed with entirely, if desired.

Other additional layers of the packaging article may include one or more layers which are permeable to oxygen.

Further additional layers, such as adhesive layers, may also be used in the packaging article. Compositions typically used for adhesive layers include anhydride functional polyolefins and other well-known adhesive layers. Such adhesive layers may be used as tie layers between no more than one face of each EVOH oxygen barrier layer and other layers of the packaging article.

In one packaging article, preferred for packaging of food and scavenging of oxygen found in the packaged food, the layers include, in order starting from the outside of the package to the innermost layer of the package, (i) a moisture barrier layer, (ii) an EVOH oxygen barrier layer, (iii) an oxygen scavenging layer, and (iv) an oxygen-permeable layer. A tie layer may also be used between layers (i) and (ii) if the moisture barrier layer lacks sufficient adhesion to inhibit delamination of the EVOH oxygen barrier layer from layer (i). Control of the oxygen barrier property of (ii) limits the rate of oxygen entry to the oxygen scavenging moieties in layer (iii), and thus slows the consumption of oxygen scavenging capacity by atmospheric oxygen. Control of the oxygen permeability of layer (iv) allows setting the rate of oxygen scavenging for the overall structure independent of the composition of the scavenging component (iii). Furthermore, layer (iv) can provide a barrier to migration of the components of the outer layers, or by-products of the reaction of such components with oxygen or other reactants, into the package interior. Even further, layer (iv) can improve the heat-sealability, clarity, or resistance to blocking of the packaging article.

In another preferred embodiment, the packaging article comprises a five-layer ABCBD structure, wherein either (i) C represents an EVOH oxygen barrier layer; B represents an oxygen scavenging layer comprising an oxygen scavenging polymer comprising an ethylenic backbone and cyclic olefinic pendant groups having structure I; A represents a layer selected from a structural layer or a food contact layer; and D represents a layer selected from a structural layer or a food contact layer, wherein A and D can represent layers with identical composition, or (ii) B represents an EVOH oxygen barrier layer; C represents an oxygen scavenging layer comprising an oxygen scavenging polymer comprising an ethylenic backbone and cyclic olefinic pendant groups having structure I; A represents a layer selected from a structural layer or a food contact layer; and D represents a layer selected from a structural layer or a food contact layer, wherein A and D can represent layers with identical composition, and A and D provide sufficient adhesion for the EVOH layers B to inhibit delamination of layers B.

In another embodiment, the present invention relates to a method of forming a multilayer packaging article, comprising:

(i) providing an EVOH composition; an oxygen scavenging polymer composition comprising a polymer comprising an ethylenic backbone and a cycloalkenyl group having structure I:

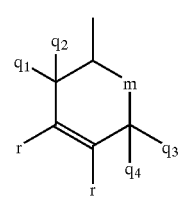

(I)

wherein $q_1$, $q_2$, $q_3$, $q_4$, and r are independently selected from hydrogen, methyl, or ethyl; m is —$(CH_2)_n$—, wherein n is an integer from 0 to 4, inclusive; and, when r is hydrogen, at least one of $q_1$, $q_2$, $q_3$, and $q_4$ is also hydrogen; and a third composition; and (ii) forming the EVOH composition into at least one EVOH oxygen barrier layer of the packaging article; the oxygen scavenging composition into at least one oxygen scavenging layer of the packaging article adjacent to the EVOH oxygen barrier layer; and the third composition into at least one layer of the packaging article adjacent to the oxygen scavenging layer.

The packaging article can be flexible or rigid, as described above. EVOH, the oxygen scavenging polymer, and appropriate polymers for inclusion in the third layer, are also as described above. Preferably, the oxygen scavenging polymer is EMCM, EVCH, CHMA, or CHAA.

The forming step can be by any techniques appropriate depending on the EVOH composition, the oxygen scavenging composition, the third composition, the packaging article, and other parameters. As mentioned above, packaging articles with multiple layers are typically prepared using coextrusion, injection molding, blow molding, injection blow molding, stretch blow molding, coating, or lamination, among other techniques.

The EVOH composition can comprise optional additives, such as dyes, pigments, fillers, or structural polymers, among others.

If a transition metal catalyst is desired for inclusion in the packaging article, to catalyze oxygen scavenging by the composition, the forming step comprises forming a transition metal catalyst into at least one of the EVOH oxygen barrier layer, the oxygen scavenging layer, or a layer adjacent to the oxygen scavenging layer.

The oxygen scavenging composition can also comprise a photoinitiator, an antioxidant, a structural polymer, or other additives as described above.

The third composition can comprise any desired materials, such as oxygen scavenging polymers, oxygen barrier polymers other than EVOH, structural polymers, or structural materials (e.g. paperboard or cardboard), among others; as well as optional additives, such as dyes, pigments, fillers, or structural polymers, among others.

In addition to the EVOH oxygen barrier layer, the oxygen scavenging layer, and the layer formed from the third composition, the packaging article to be formed can comprise other layers, such as an oxygen barrier layer not comprising EVOH, a structural layer, an oxygen scavenging layer not comprising a polymer comprising an ethylenic backbone and a cycloalkenyl group having structure I or not adjacent to an EVOH oxygen barrier layer or both, or a seal layer or food contact layer forming the interior surface of the packaging article, among others. Depending on the desired form of the packaging article, the forming step can comprise forming the packaging article as a flexible article or a rigid article.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Materials

One lot of EVOH (Soarnol A4412, from Nippon Synthetic Chemical Industry Co.) contained 44 mole % ethylene content and had a melt index of 12 g/10 min at 210° C. and a loading of 2.16 kg, and a melting point of 164° C. The EVOH resin was dried at 90° C. for 12 hr under vacuum to remove moisture.

A second lot of EVOH (Eval F101A, from Evalca Inc.) contained 32 mole % ethylene content and had a melt index of 3.6 g/10 min at 210° C. and a loading of 2.16 kg, and a melting point of 183° C. It was dried at 90° C. for 12 hr under vacuum to remove moisture.

EMCM was obtained from Chevron Chemical Co.; its composition was discussed in the previous section.

An EMAC-based cobalt master batch (containing 1 wt % tribenzoyl triphenylbenzene (BBP[3]) and 1 wt % cobalt as cobalt oleate) was obtained from Chevron Chemical Co.

The oxygen scavenging polymer resin used in forming the scavenging layer in the multilayered films of the following examples was obtained by compounding 90 wt % EMCM and 10 wt % catalyst master batch on a twin screw Haake extrusion machine. A flat temperature profile of 170° C. (zone 1–4) was used with a screw speed of 30 rpm. The compounding was typically done within a few hours prior to film casting.

Example 1

A three-material 5-layer ABCBA type film (PET/OSP/EVOH/OSP/PET) was made from PET, EVOH (Eval F101A) and the oxygen scavenging polymer (OSP, pre-blended pellets containing 90 wt % EMCM and 10 wt % catalyst master batch) on a Randcastle extrusion machine. The material of each individual layer was fed into one of the three extruders. While in the die, the layers were juxtaposed and combined, then emerged from the die as a five-layer film. After exiting the die, the film was oriented monoaxially: the extrudate was cast onto a water-tempered casting roll with stretching in the machine direction and the film was then collected on a second roll. The extruder temperatures for PET were set at 450° F. (zone 1–3); the extruder temperatures for EVOH were set at 450° F. (zone 1–3); and the extruder temperatures for OSP were set at 360° F. (zone 1–3). The die temperature was set at 500° F. The screw speed for the individual extruder was adjusted along with the rotation speed of the casting roll so that the individual layers were controlled at 1.0 mil thickness with a total thickness of 5 mil.

Example 2 (Comparative)

Control Sample: A two-material 3-layer ABA type film (PET/EVOH/PET) was made from PET and EVOH (Eval F101A). The material of each individual layer was fed into one of the two extruders. The extruder temperatures for PET were set at 550° F. (zone 1–3) and the extruder temperatures for EVOH were set at 450° F. (zone 1–3). The die temperature was set at 500° F. The screw speed for the individual extruder was adjusted along with the rotation speed of the casting roll so that the individual layers were controlled at 1.0 mil thickness, with a total thickness of 3 mil.

Example 3

A three-material 5-layer ABCBA type film (PE/EVOH/OSP/EVOH/PE) was made from low density PE (Chevron PE 4517), EVOH (Soarnol A4412) and the oxygen scavenging polymer (OSP, pre-blended pellets containing 90 wt % Chevron EMCM and 10 wt % catalyst master batch) on a Randcastle extrusion machine. The material of each individual layer was fed into one of the three extruders. The extruder temperatures for PE were set at 360° F. (zone 1–3); the extruder temperatures for EVOH were set at 450° F. (zone 1–3); and the extruder temperatures for OSP were set at 360° F. (zone 1–3). The die temperature were set at 450° F. The screw speed for the individual extruder was adjusted along with the rotation speed of the casting roll so that the individual layers were controlled at 1.0 mil thickness with a total thickness of 5 mil.

Example 4

A three-material 5-layer ABCBA type film (PE/EMCM/EVOH/EMCM/PE) was made from low density PE (Chevron PE 4517), EVOH (Soarnol A4412) and the Chevron EMCM resin on a Randcastle extrusion machine. This sample did not contain the catalyst, so to provide a control sample to validate the barrier performance enhancement from Example 3. The processing conditions and the thicknesses of the individual layers were the same as in Example 3.

Example 5

A two-material 3-layer ABA type film (EVOH/OSP/EVOH) was made from low density PE (Chevron PE 4517), EVOH (Soarnol A4412) and the oxygen-scavenging polymer (OSP, pre-blended pellets containing 90 wt % Chevron EMCM and 10 wt % catalyst master batch) on a Randcastle extrusion machine. The EVOH and OSP were fed into one of the two extruders. The extruder temperatures for EVOH were set at 430° F. (zone 1–3) and the extruder temperatures for OSP were set at 360° F. (zone 1–3). The die temperature was set at 430° F. The screw speed for the individual extruder was adjusted along with the rotation speed of the casting roll so that the EVOH skin layers had a thickness of 0.5 mil, while the OSP core layer had a thickness of 1.0 mil.

Example 6 (Comparative)

A two-material 3-layer ABA type film (PE/EVOH/PE) was made from PE (Chevron PE 4517) and EVOH (Soarnol A4412). The material of each individual layer was fed into one of the two extruders. The extruder temperatures for PE were set at 360° F. (zone 1–3) and the extruder temperatures for EVOH were set at 450° F. (zone 1–3). The die temperature was set at 450° F. The screw speed for the individual extruder was adjusted along with the rotation speed of the casting roll so that the individual layers were controlled at 1.0 mil thickness with a total thickness of 3 mil.

Example 7 (Comparative)

A two-material 3-layer ABA type film (PE/EVOH/PE) was made from PE (Chevron PE 4517) and EVOH (Soarnol A4412). The process was same as that from Example 6, except that the EVOH core layer thickness was increased from 1.0 mil to 2.0 mil by increasing the screw speed on the EVOH extruder.

Example 8
Oxygen Transmission Test on Mocon

All the films were tested for oxygen permeability using a Mocon Ox-Trans 2/20 ML system at 23° C. Nitrogen containing 2% hydrogen was used as carrier gas to flush both sides of the film at 10 cc/min flow rate for one to three days before testing. Air was used as test gas at 10 cc/min flow rate. The oxygen permeability was measured in cubic centimeters per $m^2$ per 24 hours. The film size for the test was 5 $cm^2$. The films were tested typically within a few days after the films were made.

From the above table, we conclude that the presence of an oxygen scavenging polymer layer (EMCM plus a cobalt master batch) in the multilayer structures can significantly improve the oxygen barrier performance, and zero oxygen transmission can be achieved.

By comparing Examples 1 and 2, it is shown that the presence of oxygen scavenging layers in the structures reduced the oxygen transmission rate to zero (below the limit of detection), even both samples contains the same thickness of non-active barrier layers (EVOH and PET).

By comparing Examples 3 and 4, the difference in oxygen transmission rate (0 $cc/m^2$*day vs. 2.0 $cc/m^2$*day) reflects the fact that the enhancement in barrier performance can only be achieved if the scavenging mechanism (as catalyzed by a transition metal as shown in Example 4) is present. In other words, Example 4 showed that the physical barrier contribution from a 'non-active' oxygen scavenging polymer layer (by excluding the master batch which contains a transition metal catalyst), would be negligible to the barrier performance of the multilayer film.

The further comparison of Examples 3 and 5 with the control samples from Examples 6 and 7 further validated the significant improvement in the oxygen barrier performance when an OSP layer is present in the multilayer structures comprising EVOH as separate layers. For the OSP-containing multilayered films, no delamination was detected when the films were soaked into appropriate solvent, such as acetone (not shown). This demonstrates the ability of an oxygen scavenging layer comprising an oxygen scavenging polymer comprising cyclic olefinic pendant groups having structure I to function as a tie layer in the multilayered structures, in addition to its function as a scavenging layer which leads to significantly improved oxygen barrier performance in the multilayered structures.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All

TABLE 1

Oxygen Permeability Vs. Layer Composition in Multilayer Films

| Sample | Layer Composition | Individual Layer Thickness (mil) | Total EVOH Layer Thickness | Total OSP Layer Thickness (mil) | $O_2$ RT $cc/(m^2 \cdot Day)$ |
| --- | --- | --- | --- | --- | --- |
| Example 1 | PET/OSP/EVOH[a]/OSP/PET | 1.0/1.0/1.0/1.0/1.0 | 1.0 | 2.0 | 0 |
| Example 2 | PET/EVOH[a]/PET | 1.0/1.0/1.0 | 1.0 | 0 | 2.3 |
| Example 3 | PE/EVOH[b]/OSP/ EVOH[b]/PE | 1.0/1.0/1.0/1.0/1.0 | 2.0 | 1.0 | 0 |
| Example 4 | PE/EVOH[b]/EMCM/EVOH[b]/PE | 1.0/1.0/1.0/1.0/1.0 | 2.0 | 0 | 2.0 |
| Example 5 | EVOH[b]/OSP/EVOH[b] | 0.5/1.0/0.5 | 1.0 | 1.0 | 0 |
| Example 6 | PE/EVOH[b]/PE | 1.0/1.0/1.0 | 1.0 | 0 | 6.3 |
| Example 7 | PE/EVOH[b]/PE | 1.0/2.0/1.0 | 2.0 | 0 | 3.2 |

EVOH[a] = Soamol A4412, contains 44% mole ethylene unit; EVOH[b] = Eval F101A, contains 32% mole ethylene unit.

What is claimed is:

1. A packaging article, comprising:
   an oxygen barrier layer comprising poly(ethylene vinyl alcohol) (EVOH),
   an oxygen scavenging layer adjacent to the oxygen barrier layer, wherein the oxygen scavenging layer comprises an oxygen scavenging polymer comprising an ethylenic backbone and a cyclic olefinic pendant group having structure I:

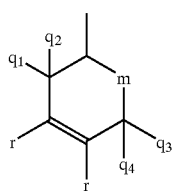

(I)

wherein $q_1$, $q_2$, $q_3$, $q_4$, and r are independently selected from hydrogen, methyl, or ethyl; m is —$(CH_2)_n$—, wherein n is an integer from 0 to 4, inclusive; and, when r is hydrogen, at least one of $q_1$, $q_2$, $q_3$, and $q_4$ is also hydrogen; and,
   a layer adjacent to the oxygen scavenging layer.

2. The packaging article of claim 1, wherein the oxygen scavenging polymer further comprises a linking group between the ethylenic backbone and the pendant group, wherein the linking group is selected from:
—O—$(CHR)_n$—; —(C=O)—O—$(CHR)_n$—; —NH—$(CHR)_n$—; —O—(C=O)—$(CHR)_n$—; —(C=O)—NH—$(CHR)_n$—; or —(C=O)—O—CHOH—$CH_2$—O—.

3. The packaging article of claim 1, further comprising a transition metal salt in the oxygen scavenging layer or a layer adjacent to the oxygen scavenging layer.

4. The packaging article of claim 3, wherein the transition metal is selected from cobalt, copper, nickel, iron, manganese, rhodium, or ruthenium.

5. The packaging article of claim 3, wherein the transition metal salt is cobalt oleate, cobalt stearate, or cobalt neodecanoate.

6. The packaging article of claim 1, further comprising a photoinitiator in the oxygen scavenging layer.

7. The packaging article of claim 1, further comprising an antioxidant in the oxygen scavenging layer.

8. The packaging article of claim 7, wherein the antioxidant is selected from 2,6-di(t-butyl)-4-methylphenol(BHT), 2,2'-methylene-bis(6-t-butyl-p-cresol), triphenylphosphite, tris-(nonylphenyl)phosphite, vitamin E, tetra-bismethylene 3-(3,5-ditertbutyl-4-hydroxyphenyl)-propionate methane, or dilaurylthiodipropionate.

9. The packaging article of claim 1, further comprising an oxygen scavenging layer not adjacent to an EVOH barrier layer.

10. The packaging article of claim 9, wherein the oxygen scavenging layer not adjacent to the EVOH barrier layer comprises an oxygen scavenging polymer comprising an ethylenic backbone and a cycloalkenyl group with structure I:

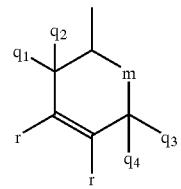

(I)

wherein $q_1$, $q_2$, $q_3$, $q_4$, and r are independently selected from hydrogen, methyl, or ethyl; m is —$(CH_2)_n$—, wherein n is an integer from 0 to 4, inclusive; and, when r is hydrogen, at least one of $q_1$, $q_2$, $q_3$, and $q_4$ is also hydrogen.

11. The packaging article of claim 10, wherein the oxygen scavenging polymer of the oxygen scavenging layer not adjacent to the EVOH barrier layer further comprises a linking group between the ethylenic backbone and the pendant group, wherein the linking group is selected from:
—O—$(CHR)_n$—; —(C=O)—O—$(CHR)_n$—; —NH—$(CHR)_n$—; —O—(C=O)—$(CHR)_n$—; —(C=O)—NH—$(CHR)_n$—; or —(C=O)—O—CHOH—$CH_2$—O—.

12. The packaging article of claim 1, wherein the packaging article is either flexible or rigid.

13. A method of forming a packaging article comprising an oxygen barrier layer comprising poly(ethylene vinyl alcohol) (EVOH), an oxygen scavenging layer adjacent to the EVOH oxygen barrier layer, and a layer adjacent to the oxygen scavenging layer, the method comprising:
   providing an oxygen barrier composition comprising EVOH;
   providing an oxygen scavenging composition comprising a polymer comprising an ethylenic backbone and a cyclic olefinic pendant group having structure I:

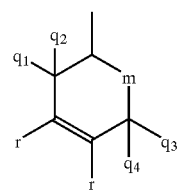

(I)

wherein $q_1$, $q_2$, $q_3$, $q_4$, and r are independently selected from hydrogen, methyl, or ethyl; m is —$(CH_2)_n$—, wherein n is an integer from 0 to 4, inclusive; and, when r is hydrogen, at least one of $q_1$, $q_2$, $q_3$, and $q_4$ is also hydrogen;
   providing a third composition; and
   forming the oxygen barrier composition into the EVOH oxygen barrier layer of the packaging article, the oxygen scavenging composition into the oxygen scavenging layer of the packaging article, and the third composition into the layer of the packaging article adjacent to the oxygen scavenging layer.

14. The method of claim 13, wherein the oxygen scavenging polymer further comprises a linking group between the ethylenic backbone and the pendant group, wherein the linking group is selected from:
—O—$(CHR)_n$—; —(C=O)—O—$(CHR)_n$—; —NH—$(CHR)_n$—; —O—(C=O)—$(CHR)_n$—; —(C=O)—NH—$(CHR)_n$—; or —(C=O)—O—CHOH—$CH_2$—O—.

15. The method of claim 13, wherein the forming step comprises forming a transition metal salt into the oxygen scavenging layer or a layer adjacent to the oxygen scavenging layer of the packaging article.

16. The method of claim 13, wherein the oxygen scavenging layer further comprises a photoinitiator.

17. The method of claim 13, wherein the oxygen scavenging layer further comprises an antioxidant.

18. The method of claim 13, wherein the forming step further comprises forming an oxygen scavenging layer in the packaging article, wherein the oxygen scavenging layer is not adjacent to an EVOH oxygen barrier layer.

19. The method of claim 13, wherein the forming step further comprises forming the packaging article as a flexible article or a rigid article.

20. The packaging article of claim 1, wherein the oxygen scavenging layer substantially inhibits delamination of the oxygen barrier layer from the layer adjacent to the oxygen scavenging layer.

21. The packaging article of claim 20, comprising a five-layer ABCBD structure, wherein C represents the oxygen barrier layer comprising EVQH, B represents the oxygen scavenging layer, A represents a structural layer or a food contact layer, and D represents a food contact layer.

22. The packaging article of claim 21, wherein the structural layer comprises a structural polymer or a structural material.

23. The packaging article of claim 22, wherein the structural material is selected from paperboard or cardboard.

24. The packaging article of claim 22, wherein the structural polymer is selected from polyethylene, low density polyethylene, very low density polyethylene, ultra-low density polyethylene, high density polyethylene, polyethylene terephthalate (PET), polyvinyl chloride, ethylene-vinyl acetate, ethylene-alkyl (meth)acrylates, ethylene-(meth) acrylic acid, or ethylene-(meth)acrylic acid ionomers.

25. The packaging article of claim 24, wherein layers A and D are PET.

26. The packaging article of claim 20, wherein packaging article layers include, in order starting from an outside layer to an innermost layer, (i) a moisture layer, (ii) the oxygen barrier layer comprising EVOH, (iii) the oxygen scavenging layer, and (iv) an oxygen permeable layer.

27. The method of claim 13, wherein the oxygen scavenging layer substantially inhibits delamination of the oxygen barrier layer comprising EVOH from the third composition.

28. A method of claim 27, wherein the packaging article comprises a 5-layer ABCBD structure wherein C represents the oxygen barrier layer comprising EVOH, B represent the oxygen scavenging layer, and A represents a structural layer or a food contact layer, and D represents a food contact layer.

29. The method of claim 28, wherein the structural layer comprises a structural polymer or a structural material.

30. The method of claim 29, wherein the structural material is selected from paperboard or cardboard.

31. The method of claim 29, wherein the structural polymer is selected from polyethylene, low density polyethylene, very low density polyethylene, ultra-low density polyethylene, high density polyethylene, polyethylene terephthalate (PET), polyvinyl chloride, ethylene-vinyl acetate, ethylene-alkyl (meth)acrylates, ethylene-(meth) acrylic acid, or ethylene-(meth)acrylic acid ionomers.

32. The method of claim 31, wherein layers A and D are PET.

33. The method of claim 25, wherein the packaging article comprises layers, in order starting from an outside layer to an innermost layer, (i) a moisture layer, (ii) the oxygen barrier layer comprising EVOH, (iii) the oxygen scavenging layer, and (iv) an oxygen permeable layer.

* * * * *